3,116,863
APPARATUS FOR METHOD OF SPLITTING GLASS SHEETS
Bernard Long, Paris, France, assignor to Glaces de Boussois, S.A., Paris, France, a corporation of France
Filed Sept. 7, 1960, Ser. No. 54,515
Claims priority, application France Sept. 8, 1959
8 Claims. (Cl. 225—2)

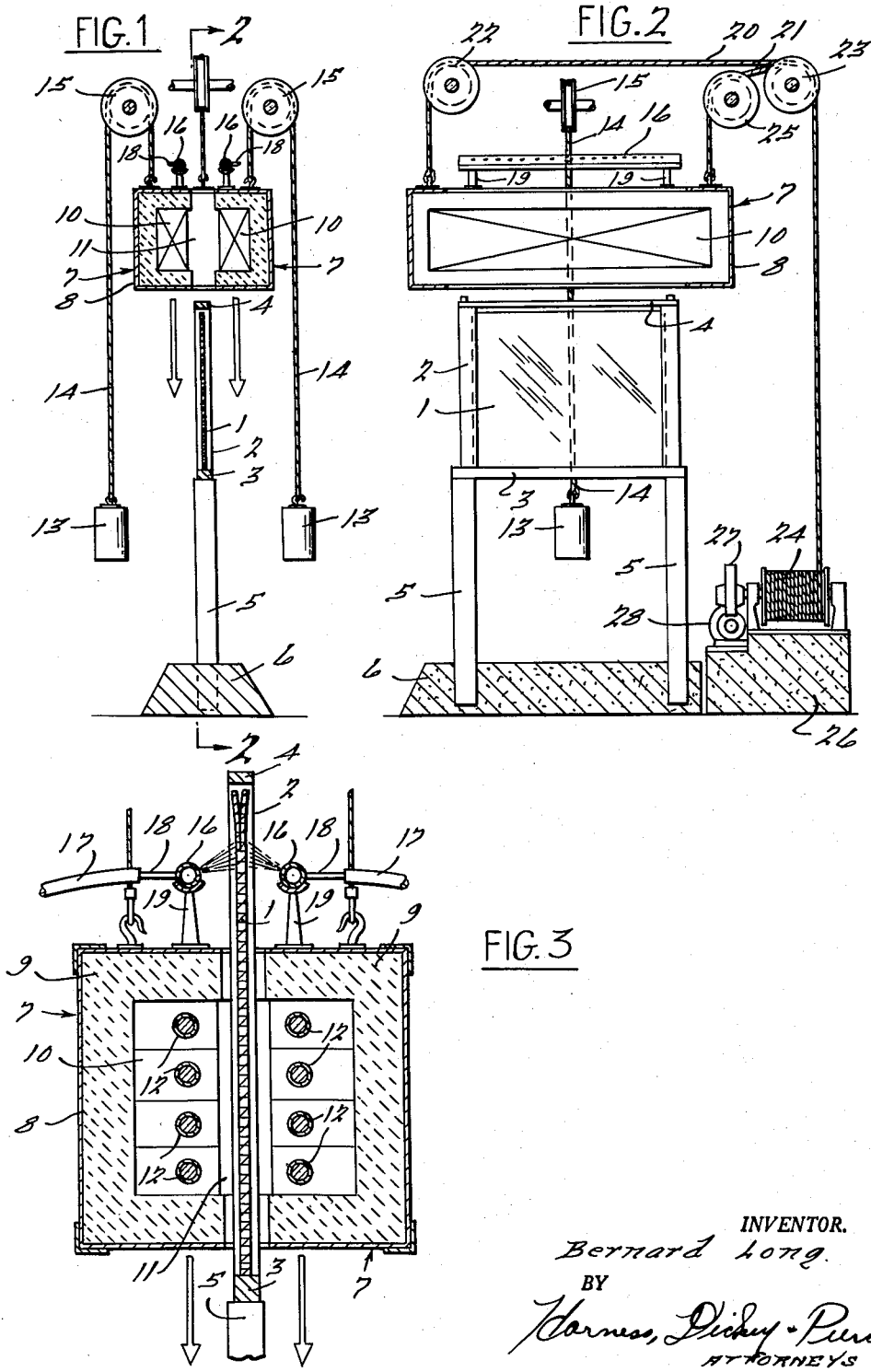
Jan. 7, 1964     B. LONG     3,116,863
APPARATUS FOR AND METHOD OF SPLITTING GLASS SHEETS
Filed Sept. 7, 1960
INVENTOR.
Bernard Long United States Patent Office 3,116,863
Patented Jan. 7, 1964

The present invention relates generally to the production of laminated glass, or what is commonly called safety glass. Such glass comprises two sheets of glass which are bonded together by means of a transparent plastic interlayer to form a unitary transparent glass sheet or pane of glass.

The present invention is primarily concerned with those steps in the manufacture of laminated glass which have to do with the formation and preparation of the two separate sheets of glass from which a single laminated glass sheet or pane may subsequently be formed. It will be readily appreciated that the method hereinafter described and claimed may be used for many other purposes than for the production of laminated glass, however, it will be understood that it is primarily useful for laminated glass production.

This application is a continuation-in-part of my prior copending application, Serial No. 662,614, filed May 31, 1957, now Patent No. 2,959,507, and is filed under the International Convention corresponding to French patent application, Serial No. 804,603, filed September 8, 1959.

The particular method to which the present invention relates has to do with the cleavage or separation of a single glass sheet along a plane generally parallel to the major faces of the sheet to form two separate sheets of glass each having a surface area substantially the same as the original sheet from which they were formed and each having a thickness approximately one-half that of said original sheet.

According to the teachings of my prior copending application, a glass sheet or pane is first scored along its edge surfaces along lines generally intermediate the major opposed faces of the sheet and generally parallel to the planes in which said major opposed faces lie. The glass sheet thus scored is then heated to a predetermined temperature in a suitable furnace. The sheet is then removed from the furnace and progressively and relatively rapidly cooled. The cooling medium is simultaneously applied to opposed surfaces along one edge and extending from one side of the sheet to the other. This line of cooling is then moved simultaneously transversely across the said sheet. A fracture of the sheet is initiated at the score line on the edge of the sheet where the line of cooling is first applied and progresses across the sheet as the opposed surfaces thereof are simultaneously cooled until the opposite edge of the sheet is reached and the original sheet separated into two separate sheets of the same configuration as the original sheet but approximately one-half the thickness thereof.

The present invention is an improvement over that of my prior copending application although it relates to the same general type of thermal cleavage or splitting of a glass sheet and the same physical principles are involved.

In accordance with the practice of my prior application, the scored sheet is introduced cold into a furnace. It has been found that in so doing, convection currents are set up which make it difficult to obtain a temperature distribution which is uniform throughout the width and thickness of the sheet.

It has been found that this uniform heating of the sheet and uniform distribution of temperature throughout the sheet is desirable in order to obtain uniform results.

Further, it has been found that a smoother finish of the interfaces of the split sheets can be obtained by the process hereinafter described and claimed than by the process described in my prior copending application.

It has been found that in any splitting or thermal cleaving of glass certain striations and undulations result on the mating faces, and while these mating faces are wholly and totally complemental, it is desirable to reduce these irregularities to a minimum and that consideration in this respect is accomplished by the practice of the process and use of the apparatus hereinafter described and claimed.

While but one embodiment of the invention is shown in the drawings and described in detail in the following specification, many other and further modifications will be apparent to those skilled in the art.

In the drawings:

FIGURE 1 is a schematic sectional view of apparatus for cleaving or splitting a glass sheet in accordance with teachings of the present invention;

FIGURE 2 is a vertical sectional view of the apparatus shown in FIGURE 1, taken along the line 2—2 of FIGURE 1, and FIGURE 3 is a fragmentary enlarged vertical sectional view of the apparatus shown in FIGURES 1 and 2, showing the heating and cooling units in lowered position.

With particular reference to the specific embodiment of the invention illustrated in the accompanying drawings, it will be seen that a glass sheet 1, which is to be split or cleaved is mounted in a frame which in the embodiment shown is rectilinear in shape and comprises a pair of vertically arranged side pieces 2 supported on a horizontal base member 3. A removable top member 4 is secured by suitable bolts to the upper ends of the side pieces 2 to permit easy installation and removal of the glass sheets being split.

The frame described above is mounted on a pair of vertical posts 5, supported in a suitable foundation 6.

A pair of oppositely disposed heating units are designed and arranged to heat opposite surfaces of the glass sheet 1 throughout a band or zone extending from side to side thereof and as is hereinafter described these heating units are mounted for simultaneous downward movement over the surface of the sheet so that during the cycle of operation of the apparatus the entire surface of the glass sheet 1 may be exposed to the desired amount of heat.

The heating units each comprise a chambered half furnace 7 which may be formed from a steel outer casing or shell 8 and lined with refractory brick or other refractory material 9 to form a pair of oppositely facing chambers 10. These heating units are of a length so that the chambers 10 extend transversely throughout the transverse width of the glass sheet 1, to be split and are designed and intended to heat a band or zone of said sheet throughout a relatively narrow band extending from side to side thereof.

The casings or shells 8 of the two opposed heating units may be, if desired, joined together at their ends in a manner not shown in the drawings, to form a unitary furnace structure having a vertical slot or opening 11 extending therethrough. It will be clear that this slot or opening 11 is of such dimension as to permit the heating units to be lowered down over the glass sheet 1 and its surrounding frame.

Each of the chambered half-furnaces is provided, interiorly thereof, with heat sources designed and intended to apply the requisite amount of heat simultaneously to the opposite faces of the glass sheet throughout a zone extending from one side edge of the sheet to the other. While any suitable source of heat may be employed, in the embodiment shown four horizontal electrical resistance heating units 12 are employed in each of the chambers 10. These heating units 12 are supplied with electrical current through suitable flexible cables in the conventional manner from a suitable source not shown.

In order to lower the heating units downwardly over the surface of the glass sheet 1 and its surrounding frame the heating units may be counterbalanced for downward movement by means of a pair of counterweights 13 suspended by cables 14 passing over suitably mounted pulleys 15, and anchored to each of the half-furnaces. The counterweights 13 are preferably lighter in weight than the furnace structure so that the heating units tend to move downwardly but are much more easily handled and controlled.

Means are provided for cooling opposed zones of the surfaces of the glass sheet 1 throughout those portions thereof which have just been heated by means of the heating units above described. This cooling means comprises a pair of transversely extending manifolds 16 which are provided in the portions thereof facing the glass sheet, with a series of apertures in order to subject the opposed surfaces of the glass sheet 1 to a cooling blast of air throughout the horizontal zone thereof which has just previously been heated by means of the heating apparatus above described.

The manifolds 16 are supplied with compressed air or other cooling fluid by means of flexible hoses or conduits 17 connected to said manifolds by means of suitable nipples 18. The hoses or conduits 17 are connected to a suitable source of compressed air (not shown) the temperature and pressure of which may conveniently be regulated in any well known and conventional manner.

While, if desired, the opposed cooling manifolds 16 may be supported and moved entirely independently of the heating units in the specific embodiment of the invention shown in the drawings, these manifolds are supported on the shells or casings 8 by means of posts or supports 19 so that these cooling units will be automatically raised and lowered with the heating units on which they are mounted.

While any suitable means may be employed for moving the heating and cooling means over the surface of the glass sheet 1 and its associated frame, in the construction shown in the drawings, the heating units (and associated cooling units) are supported, lowered and raised by means of a pair of cables 20 and 21, attached adjacent the ends of the casings 8. The cable 20 passes over a suitably mounted idler pulley 22, idler pulley 23 and downwardly to a cable drum 24. The cable 21 passes over a similar idler pulley 25, thence over the pulley 23 and downwardly to the drum 24 so that both cables 20 and 21 can be simultaneously wound upon or unwound from the drum 24 in order to maintain the heating and cooling units in horizontal position as they are raised and lowered.

The winding drum 24 and its associated driving mechanism may conveniently be mounted on a suitable foundation 26. The drum 24 may be driven through suitable reduction gearing 27 by means of an electric motor 28. The drive motor 28 is preferably not only reversible but also provided with suitable conventional speed controls so that not only can the direction of rotation, but also the speed thereof be controlled with a reasonable degree of precision.

In order to operate the apparatus according to the improved method of the present invention the motor 28 is actuated to raise the heating and cooling units to substantially the position shown in FIGURES 1 and 2 of the drawings.

A sheet of glass to be split is first scored to provide a line from which a fracture may start. This score line may be produced with a diamond tool or any other tool or device conventionally used to provide a score line as is customary in the cutting of glass. This score line should be made along all four edge surfaces of the glass sheet to be split and should follow a line generally parallel to the major surfaces of the sheet and intermediate thereof. The glass sheet to be split may be what is known as plate glass in which the major surfaces are mechanically ground and polished or may be what is known as sheet glass. The particular chemical composition of the glass is not critical or important.

The sheet of glass thus scored is mounted in the frame above described by first removing the top crosspiece 4 and locating the sheet with its bottom edge on the crosspiece 3 with its side edges confined between the vertical side members 2. The top frame member is then replaced and bolted in position. It has been found desirable to have the parts arranged so that a small space exists between the top edge of the glass sheet 1 and the upper frame member 4 when the sheet is finally assembled in the frame.

The heating units 12 are then energized and the compressed air turned on to supply air to the manifolds 16. The motor 28 is then run to slowly rotate the drum 24 to unwind the cables 20 and 21 therefrom thereby gradually lowering the heating and cooling units past the surface of the glass sheet. The optimum rate of movement of the heating and cooling units over the surface of the glass sheet may depend on a number of factors such for example, as the amount of heat supplied to the sheet by the heating elements 12, the thickness of the glass sheet, etc.

In any event it is desirable to heat the glass sheet to a temperature somewhat below but certainly not in excess of the strain point of the particular glass composition undergoing treatment.

As the heating units move downwardly the blasts of cooling air from the manifolds 16 will serve to relatively rapidly cool that horizontal zone of the sheet which has just previously been heated by the heating units and a fracture will commence at the upper marginal edge of the sheet initiated by the score line therealong.

As the heating and cooling units move downwardly the fracture or cleavage front will progress downwardly until the glass sheet is split into two separate sheets each of an area substantially the same as the original sheet and approximately one-half the thickness thereof.

The mating faces of the two sheets thus formed will have slight striations, undulations and irregularities but at the same time will be wholly and completely complemental, so that one or both of these faces may be sprayed or coated with a suitable plastic material and the two sheets reunited with a tough plastic interlayer of uniform thickness therebetween, to form a unitary sheet of safety glass.

If desired, the two split sections may be reunited by using a film or sheet of plastic material to bond the same together. In any event, it is desirable to utilize a plastic material having as nearly as possible the same index of refraction as the glass with which it is associated so that the final product will have satisfactory optical characteristics.

In order to obtain the most satisfactory final product it is desirable to reduce, as much as possible, the magnitude of the striations, undulations and irregularities in the surfaces resulting from the cleavage. This can be done by uniform heating of the particular area of the sheet, uniform cooling of the previously heated area and eliminating as far as possible vibration of the sheet during the fracturing process.

It will be obvious to those skilled in the art that many other and further modifications of the method and apparatus described above and shown in the drawings may be made without departing from the generic spirit and scope of the invention as defined in the following claims.

What is claimed is:

1. The method of splitting a sheet of glass to form two sheets of the same area as the sheet split and each of said two sheets being of approximately one-half the thickness of said sheet, which method comprises scoring the edge portions of said sheet along lines intermediate the faces of said sheet, simultaneously heating opposite faces of said sheet in zones extending transversely across said sheet from one side thereof to the other adjacent one edge of said sheet, simultaneously moving the means providing said zones of heating across said sheet from said one edge to the opposite edge, and cooling the face of said sheet progressively in that zone thereof which has just previously been heated to fracture said sheet along a plane parallel to and intermediate of the faces of said sheet.

2. The method of splitting a glass sheet along a plane generally parallel to and intermediate of the faces of said sheet, which method comprises scoring said sheet on the edges thereof along lines parallel to and intermediate the faces thereof, supporting said scored sheet in generally vertical position, simultaneously applying heat to opposite faces of said sheet in elongated zones extending from side to side of said sheet at the top edge thereof, progressively and simultaneously moving the means providing said zones of heating downwardly over the opposite surfaces of said sheet and progressively and simultaneously cooling those zones of said sheet which have just previously been heated.

3. The method of splitting a glass sheet along a plane generally parallel to the faces of said sheet which comprises scoring the edges of said sheet along lines generally parallel to and intermediate the faces of said sheet, simultaneously heating opposed faces of said sheet in zones along one edge thereof and extending from side to side of said sheet, simultaneously moving the means providing said zones of heating from said edge transversely across said sheet and simultaneously cooling the opposed faces of said sheet throughout those zones thereof which have just previously been heated.

4. The method of splitting a glass sheet along a plane generally parallel to the faces of said sheet which comprises scoring the edges of said sheet along lines generally parallel to and intermediate the faces of said sheet, simultaneously heating opposed faces of said sheet in zones along one edge thereof and extending from side to side of said sheet, simultaneously moving the means providing said zones of heating from said edge transversely across said sheet and applying jets of cold air simultaneously to opposite faces of said sheet in the zones thereof which have just previously been heated, to progressively fracture said sheet along a plane generally parallel to the opposed faces of said sheet.

5. The method of splitting a glass sheet along a plane generally parallel to the opposed faces thereof which comprises scoring the edges of said sheet along lines generally parallel to and intermediate of said opposed faces, mounting said scored sheet in a generally vertical position, lowering a pair of heating units gradually past the opposed faces of said sheet to first heat said sheet in a zone at the upper edge thereof and throughout its width from side to side, lowering said heating units to simultaneously and progressively heat said sheet along a transverse zone extending from side to side of said sheet which zone moves downwardly from top to bottom of said sheet as said heating units are moved downwardly, and simultaneously and progressively cooling those zones of said sheet which have just previously been heated.

6. The method of splitting a glass sheet along a plane generally parallel to the opposed faces thereof which comprises scoring the edges of said sheet along lines generally parallel to and intermediate of said opposed faces, mounting said scored sheet in a generally vertical position, lowering a pair of heating units gradually past the opposed faces of said sheet to first heat said sheet in a zone at the upper edge thereof and throughout its width from side to side, lowering said heating units to simultaneously and progressively heat said sheet along a transverse zone extending from side to side of said sheet which zone moves downwardly from top to bottom of said sheet as said heating units are moved downwardly, and simultaneously and progressively cooling those zones of said sheet which have just previously been heated, said cooling being accomplished by simultaneously applying blasts of cold air to opposite surfaces of said sheet.

7. The method of splitting a glass sheet to form a pair of glass sheets each having a surface area substantially the same as the sheet from which they were formed, which method comprises scoring the edges of said sheet along lines generally parallel to and intermediate the faces thereof, applying zones of heat adjacent one edge of said sheet and extending from side to side thereof, said zones of heat being simultaneously applied to opposed faces of said sheet, moving the means providing said zones of heat simultaneously, transversely across said sheet from said edge to the opposite edge and simultaneously and progressively cooling the opposed faces of said sheet in the zones thereof which have just previously been heated.

8. The method of splitting a sheet of glass substantially along a plane intermediate and generally parallel to the faces of said sheet, which method comprises scoring the edges of said sheet along lines generally parallel to and intermediate the faces of said sheet, traversing the entire area of said sheet from one end to the opposite end thereof with means providing a zone of heat at least as wide as the dimension of said sheet normal to the direction of traversing movement, and immediately thereafter similarly traversing said sheet in the same direction with means providing a similar zone of cooling to fracture said sheet substantially along said plane.

References Cited in the file of this patent

UNITED STATES PATENTS

| | | |
|---|---|---|
| 2,125,922 | Hopfield | Aug. 9, 1938 |
| 2,365,967 | Long | Dec. 26, 1944 |
| 2,372,215 | McCormick | Mar. 27, 1945 |
| 2,378,091 | McCormick | June 12, 1945 |
| 2,577,616 | Eves | Dec. 4, 1951 |
| 2,584,851 | Dunipace | Feb. 5, 1952 |
| 2,695,475 | Ellis | Nov. 20, 1954 |
| 2,884,312 | Kuryla | Apr. 28, 1959 |
| 2,887,806 | Hassett | May 26, 1959 |
| 2,917,871 | Atkeson | Dec. 22, 1959 |

FOREIGN PATENTS

| | | |
|---|---|---|
| 70,086 | France | Oct. 13, 1958 |
| 1,162,232 | France | Apr. 8, 1958 |